Figure 1:
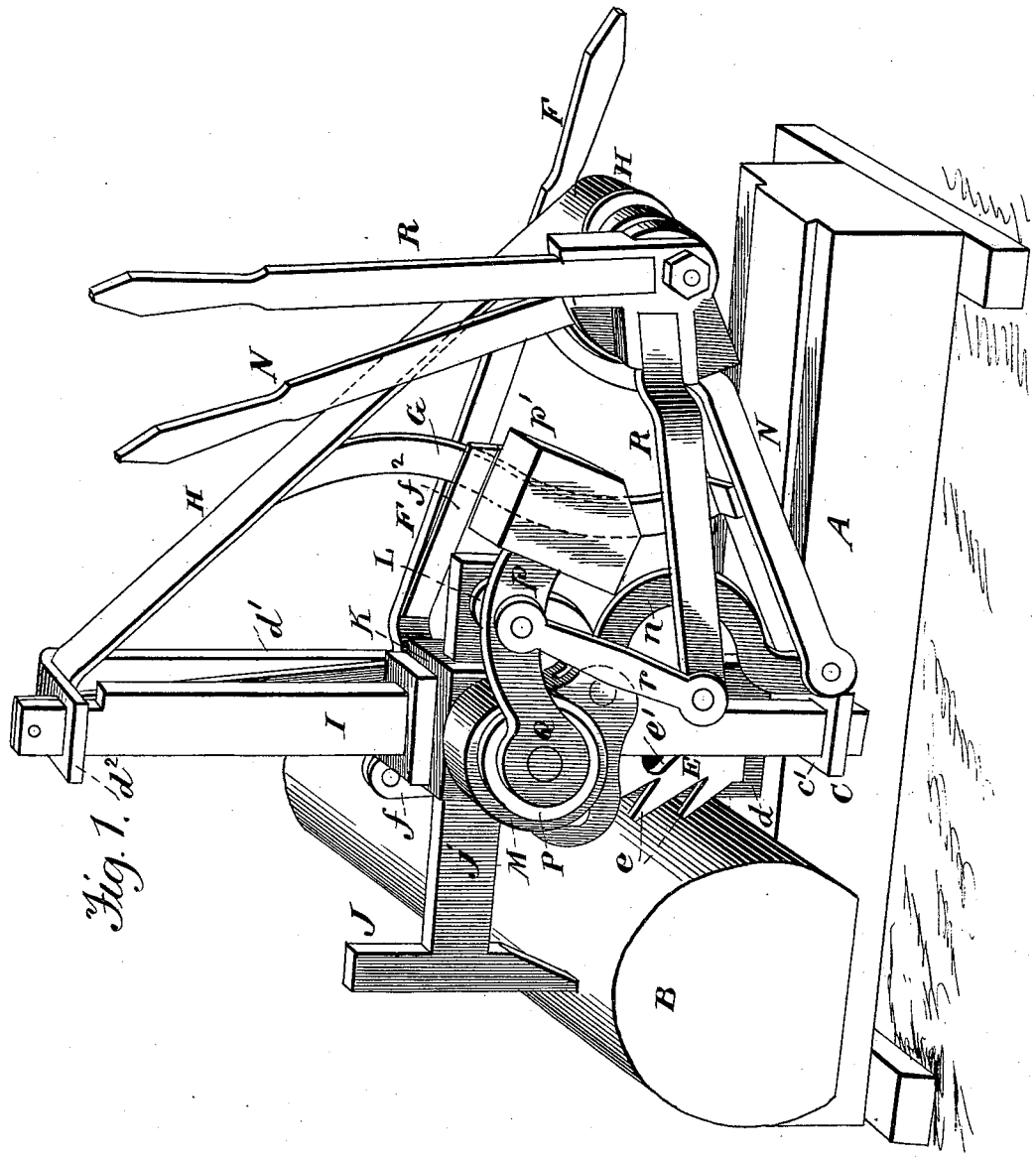

(No Model.) 2 Sheets—Sheet 1.

J. D. OWEN.
SAW MILL DOG.

No. 459,526. Patented Sept. 15, 1891.

Witnesses
A. Ruppert.
H. A. Daniels

Inventor:
James D. Owen,
Per
Thomas P. Simpson,
Atty.

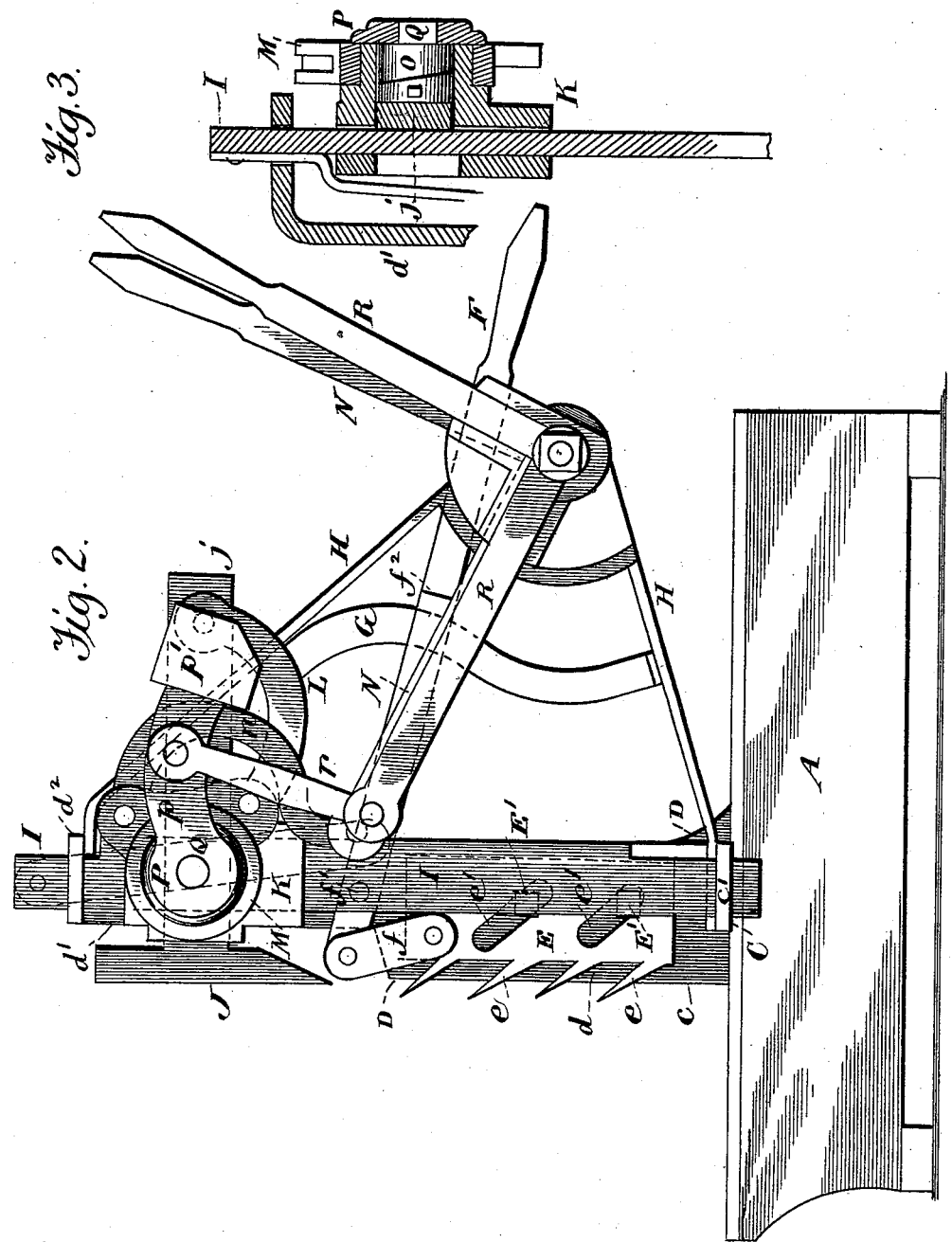

UNITED STATES PATENT OFFICE.

JAMES D. OWEN, OF SILVARA, PENNSYLVANIA.

SAW-MILL DOG.

SPECIFICATION forming part of Letters Patent No. 459,526, dated September 15, 1891.

Application filed November 5, 1890. Serial No. 370,383. (No model.)

*To all whom it may concern:*

Be it known that I, JAMES D. OWEN, a citizen of the United States, residing at Silvara, in the county of Bradford and State of Pennsylvania, have invented certain new and useful Improvements in Saw-Mill Dogs; and I do hereby declare the following to be a full, clear, and exact description of the invention, such as will enable others skilled in the art to which it appertains to make and use the same.

The special object of the invention is to improve saw-mill dogs, as hereinafter described, and pointed out in the claims.

Figure 1 of the drawings is a perspective view of an elevation, and Fig. 2 a longitudinal vertical section; Fig. 3, a detail sectional view showing the dog, slide, and loose collar in their local relation to each other.

In the drawings, A represents a saw-mill block with a log B arranged upon it. The base-plate C is fastened to the upper side of the block and is L-shaped in form, so that the main plate c lies flat longitudinally upon the block, while the short arm $c'$ extends to one side beyond it. On the part c is fixed the pillar D, having a metal facing d, bolted to the inner side, and on this face d is arranged the movable plate E, which has the sharp teeth e at intervals and the oblique slots $e'$. This plate E is thus permitted to bring the teeth e inside of the pillar edge $d'$, so that the log may be adjusted in place or outside of said edge, so as to penetrate the side of log and prevent it from turning. For the purpose of making these movements with the plate E, I use the studs $E'$, on which the slotted plate moves, and I connect it with a lever F by a pivoted strap f. This lever is fulcrumed at $f'$ to an upward extension of the face-plate d and is slotted vertically, so as to slide on the curved guide G, connecting the sides of metallic V-shaped piece H. The latter is fastened at the upper end to the horizontal bend $d^2$ of the extension $d'$ of the face-plate d and at the lower end to the base-plate C. From the end of the short arm $c'$ of the base-plate C rises a post I, which is shouldered near the top and from thence upward cut away, so as to pass through a hole in the bend $d^2$.

J is the dog, which is expected to fasten in the top of log and prevent it from a front or forward movement. This dog has a rectangular shank j, which passes through the vertical slide K and is held thereto by the connecting-bar L.

M is a loose collar connected with the elbow-lever N by a pivoted and curved strap n, so that after the dog J is raised it may be run out over the log preparatory to being stuck into the top thereof, the said dog being run back by pulling said lever rearwardly.

Between the post I and the side cam O the shank j of dog J plays loosely, so as to admit of its being freely slid back and forth as the dog is thrust out or drawn in. This cam O and ring P are fast upon a shaft Q, so that all three may turn in a small arc and jam the shank j against the post I after the dog J has been stuck into the lock. This makes the dog hold the log rigidly while the mill saw or saws are at work upon it. The ring P has an arm p and an end weight $p'$ on the arm, so as to turn and hold the cam in place. With the arm p is connected the elbow-lever R by a pivoted strap r, so that when this lever is pulled back it first unlocks the dog-shank j and then lifts the dog with all its connections up to the desired height for it to "drop." One side of the slot in lever F is preferably made to form a spring $f^2$, so that the lever may be held by said spring on the guide G.

Having thus described all that is necessary to a full understanding of my invention, what I claim as new, and desire to protect by Letters Patent, is—

1. The combination, with a dog J, having the slide-shank j, the post I, and the vertical hollow slide K, of the bar L, loose collar M, elbow-lever N, and the vertical strap n, as and for the purpose set forth.

2. The combination, with a post I, dog J, having the slide-shank j and the described device for locking said shank, of the lever R, connected by strap n with weighted arm p, as and for the purpose specified.

In testimony whereof I affix my signature in presence of two witnesses.

JAMES D. OWEN.

Witnesses:
 MABEL OWEN,
 C. J. OWEN.